(12) United States Patent
Corda

(10) Patent No.: US 8,391,837 B2
(45) Date of Patent: Mar. 5, 2013

(54) METHOD, SYSTEM AND TRUSTED SERVICE MANAGER FOR SECURELY TRANSMITTING AN APPLICATION TO A MOBILE PHONE

(75) Inventor: Alexandre Corda, Nice (FR)

(73) Assignee: NXP B.V., Eindhoven (NL)

( * ) Notice: Subject to any disclaimer, the term of this patent is extended or adjusted under 35 U.S.C. 154(b) by 387 days.

(21) Appl. No.: 12/669,568

(22) PCT Filed: Jul. 21, 2008

(86) PCT No.: PCT/IB2008/052918
§ 371 (c)(1),
(2), (4) Date: Jan. 19, 2010

(87) PCT Pub. No.: WO2009/013700
PCT Pub. Date: Jan. 29, 2009

(65) Prior Publication Data
US 2010/0291896 A1 Nov. 18, 2010

(30) Foreign Application Priority Data
Jul. 24, 2007 (EP) .................................. 07290922

(51) Int. Cl.
*H04M 1/66* (2006.01)
*H04M 11/00* (2006.01)
*H04M 3/00* (2006.01)
*H04L 29/06* (2006.01)
*H04L 9/32* (2006.01)
*G06F 13/00* (2006.01)
*G06F 13/28* (2006.01)

(52) U.S. Cl. ............. 455/410; 455/403; 379/189; 726/1; 726/2; 726/36; 713/168; 711/152; 711/169; 711/170; 710/23

(58) Field of Classification Search .................. 455/410; 713/168
See application file for complete search history.

(56) References Cited

U.S. PATENT DOCUMENTS
2001/0037450 A1* 11/2001 Metlitski et al. .............. 713/152
(Continued)

FOREIGN PATENT DOCUMENTS
EP 1248188 A1 10/2002
EP 1798867 A2 * 6/2007
(Continued)

OTHER PUBLICATIONS
Essentials for Successful NFC Mobile Ecosystems—Oct. 2008.*
(Continued)

*Primary Examiner* — Wayne Cai
*Assistant Examiner* — Timothy Pham

(57) ABSTRACT

A Trusted Service Manager (TSM) receives via a first communication channel from a Service Provider (SP) a request (REQ(MIA)) that contains an application (MIA) together with a unique identifier of a mobile phone (MOB), particularly its telephone number. The mobile phone (MOB) is equipped with a memory device (MIF) that comprises multiple memory sectors being protected by sector keys. Preferably the memory device (MIF) is a MIFARE device. The TSM extracts the application (MIA) and the unique identifier from the received request, assigns destination sector(s) and associated sector key(s) of the memory device (MIF), compiles the application (MIA), the sector key(s) and the sector number(s) of the destination sector(s) into a setup-message (SU(MIA)), encrypts the setup-message and transmits it to either the mobile phone via a second communication channel or the Service Provider via the first communication channel (CN). If the setup-message (SU(MIA)) is transmitted to the Service Provider, the Service Provider sends it over the second communication channel to the mobile phone.

15 Claims, 2 Drawing Sheets

U.S. PATENT DOCUMENTS

| | | | | |
|---|---|---|---|---|
| 2002/0199099 | A1* | 12/2002 | Shirai et al. | 713/160 |
| 2003/0233546 | A1* | 12/2003 | Blom | 713/168 |
| 2004/0146163 | A1* | 7/2004 | Asokan et al. | 380/277 |
| 2005/0086497 | A1* | 4/2005 | Nakayama | 713/185 |
| 2006/0132822 | A1* | 6/2006 | Walmsley | 358/1.14 |
| 2007/0136576 | A1* | 6/2007 | Chambers et al. | 713/164 |
| 2009/0006724 | A1* | 1/2009 | Chang et al. | 711/103 |

FOREIGN PATENT DOCUMENTS

| | | |
|---|---|---|
| JP | 62-242222 | 10/1987 |
| JP | 2005251045 | 9/2005 |
| JP | 2006-506721 | 2/2006 |
| JP | 2006092542 | 4/2006 |
| JP | 2006107323 | 4/2006 |
| WO | 2006/092504 A1 | 9/2006 |

OTHER PUBLICATIONS

Philips Semiconductors; "Mifare DESfire Contactless Multi-Application IC With DES and 3DES Security"; Revision 3.0; Product Short Form Specification (Apr. 2004)12 Pages.

Benyo, B., et al; "The Design of NFC Based Applications"; 11th Int'l Conf. on Intelligent Engineering Systems; pp. 277-280 (Jul. 2007).

GSMA; "Mobile NFC Services—Version 1.0" (Feb. 2007); 24 Pages.

Nordlund, S.; "Secure Over-The-Air-Services in NFC Ecosystems"; NFC Applications Conference, Hagengerg, 26 PGS. (Mar. 2007).

Vivotech; "VIVINFC Suite" (printed from Internet Jan. 14, 2009, copyright 2001-2006).

"Giesecke & Devrient Provides Over the Air Personalization of Handsets With Paypass"; NFC News (Printed From Internet Jan. 14, 2009, Dated April 13, 2006) 4 PGS.

Nokia, Giesecke & Devrient, Press Backgrounder: "About Near Field Communication (NFC)"; Jun. 2006; 4 PAGES.

International Search Report for Int'l. Appln. No. PCT/IB2008/052918 (Jan. 29, 2009).

MIFARE ® Standard Card IC MF1 Ic S50—Functional Specification (1998). MIFARE® (http://www.itworksolutions.com/brochure/catalogue/RFID/Mifare%20S50.pdf) downloaded on Jun. 13, 2012.

Klaus Finkenzeller, "RFID Handbuch", HANSER, 3rd edition (2002). (http://www.rfid-handbook.de/book/index.html) viewed on Jun. 14, 2012.

* cited by examiner

METHOD, SYSTEM AND TRUSTED SERVICE MANAGER FOR SECURELY TRANSMITTING AN APPLICATION TO A MOBILE PHONE

FIELD OF THE INVENTION

The invention relates to a method for transmitting a service or application from a Service Provider via a Trusted Service Manager to a mobile phone being equipped with a memory device comprising a plurality of memory sectors wherein the sectors are protected against unauthorized access by sector keys.

The invention further relates to a system for transmitting a service or application from a Service Provider via a Trusted Service Manager to a mobile phone being equipped with a memory device comprising a plurality of memory sectors wherein the sectors are protected against unauthorized access by sector keys.

The invention further relates to a Trusted Service Manager being adapted to receive from a Service Provider via a first communication channel such as a computer network a request that contains an application together with a unique identifier of a mobile phone, particularly its telephone number.

The invention further relates to a computer program product directly loadable into the memory of a mobile phone being equipped with a memory device.

The invention further relates to a mobile phone being adapted to process the computer program product mentioned in the above paragraph.

BACKGROUND OF THE INVENTION

The MIFARE® classic family, developed by NXP Semiconductors is the pioneer and front runner in contactless smart card ICs operating in the 13.56 MHz frequency range with read/write capability. MIFARE® is a trademark of NXP Semiconductors. MIFARE complies with ISO14443A, which is used in more than 80% of all contactless smart cards today. The technology is embodied in both cards and card reader devices. MIFARE cards are being used in an increasingly broad range of applications (including transport ticketing, access control, e-payment, road tolling, and loyalty applications). MIFARE Standard (or Classic) cards employ a proprietary high-level protocol with a proprietary security protocol for authentication and ciphering. MIFARE® technology has become a standard for memory devices with key-protected memory sectors. One example for a published product specification of MIFARE® technology is the data sheet "MIFARE® Standard Card IC MF1 IC S50—Functional Specification" (1998). MIFARE® technology is also discussed in: Klaus Finkenzeller, "RFID Handbuch", HANSER, $3^{rd}$ edition (2002).

The MIFARE Classic cards are fundamentally just memory storage devices, where the memory is divided into sectors and blocks with simple security mechanisms for access control. Each device has a unique serial number. Anticollision is provided so that several cards in the field may be selected and operated in sequence.

The MIFARE Standard 1 k offers about 768 bytes of data storage, split into 16 sectors with 4 blocks of 16 bytes each (one block consists of 16 byte); each sector is protected by two different keys, called A and B. They can be programmed for operations like reading, writing, increasing value blocks, etc. The last block of each sector is called "trailer", which contains two secret keys (A and B) and programmable access conditions for each block in this sector. In order to support multi-application with key hierarchy an individual set of two keys (A and B) per sector (per application) is provided.

The memory organization of a MIFARE Standard 1 k card is shown in FIG. 1. The 1024×8 bit EEPROM memory is organized in 16 sectors with 4 blocks of 16 bytes each. The first data block (block 0) of the first sector (sector 0) is the manufacturer block. It contains the IC manufacturer data. Due to security and system requirements this block is write protected after having been programmed by the IC manufacturer at production. The manufacturer block is shown in detail in FIG. 2.

Now referring again to FIG. 1 all sectors of the memory contain 3 blocks of 16 bytes for storing data (except sector 0 which contains only two data blocks and the read-only manufacturer block). These data blocks can be configured by the access bits as read/write blocks for e.g. contactless access control or value blocks for e.g. electronic purse applications, where additional commands like increment and decrement for direct control of the stored value are provided. The value blocks have a fixed data format which permits error detection and correction and a backup management. An authentication command has to be carried out before any memory operation in order to allow further commands.

Each sector of the memory further has it own sector trailer (see FIG. 3) containing the secret keys A and B (optional), which return logical "0"s when read and the access conditions for the four blocks of that sector, which are stored in bytes 6 . . . 9. The access bits also specify the type (read/write or value) of the data blocks. If key B is not needed, the last 6 bytes of block 3 can be used as data bytes.

A typical transaction sequence of a MIFARE Classic card starts with an identification and selection procedure. With the select card command the reader selects one individual card for authentication and memory related operations. After selection of a card the reader specifies the memory location of the following memory access and uses the corresponding key for the following three pass authentication procedure, comprising:

1. The reader specifies the sector to be accessed and chooses key A or B.
2. The card reads the secret key and the access conditions from the sector trailer. Then the card sends a random number as the challenge to the reader (pass one).
3. The reader calculates the response using the secret key and additional input. The response, together with a random challenge from the reader, is then transmitted to the card (pass two).
4. The card verifies the response of the reader by comparing it with its own challenge and then it calculates the response to the challenge and transmits it (pass three).
5. The reader verifies the response of the card by comparing it to its own challenge.

After transmission of the first random challenge the communication between card and reader is encrypted.

After authentication typically any of the following operations may be performed: Read block, Write block, Decrement (decrements the contents of a block and stores the result in a temporary internal data-register), Increment (increments the contents of a block and stores the result in the data-register), Restore (moves the contents of a block into the data-register), Transfer (writes the contents of the temporary internal data-register to a value block). Preceding any memory operation the authentication procedure ensures that access to a block is only possible via the two keys specified for each block.

In practice, the memory operations that can be performed for an addressed block depend on the key used and the access conditions. The access conditions may be altered, provided one knows the relevant key and the current access condition allows this operation.

MIFARE ICs are typically connected to a coil with a few turns and then embedded in plastic to form a passive contactless smart card. No battery is needed since the IC is supplied with energy from the field. When the card is positioned in the proximity of the reader antenna, the high speed RF communication interface allows to transmit data with 106 kBit/s. The typical operating distance of a MIFARE memory device is up to 100 mm (depending on antenna geometry). A typical ticketing transaction needs less than 100 ms (including backup management).

To maintain the speed and convenience of MIFARE's tap-and-go operation, the MIFARE Application Directory (MAD) standard defines common data structures for card application directory entries, allowing terminals to identify the right card (and the right memory sector within the card) without the need to perform a comprehensive search through all of the cards' memories until the appropriate application is found. A typical example is when a person has MIFARE cards for both access control to his office and public transport fare collection. With the MAD, when the cardholder wants to enter his office, the access control terminal identifies the two cards and is able to choose the correct one very quickly, simply by checking the MAD. The MAD standard uses registered Application IDentifiers (AIDs) in block 1 and block 2 of sector 0 of the card's memory to enable identification of all registered card applications (remember that block 0 in sector 0 is the manufacturer block). Terminal software can then take advantage of this feature using these sector pointers instead of physical sector addresses.

SmartMX (Memory eXtension) is a family of smart cards that have been designed by NXP Semiconductors for high-security smart card applications requiring highly reliable solutions, with or without multiple interface options. Key applications are e-government, banking/finance, mobile communications and advanced public transportation.

The ability to run the MIFARE protocol concurrently with other contactless transmission protocols implemented by the User Operating System enables the combination of new services and existing applications based on MIFARE (e.g. ticketing) on a single Dual Interface controller based smart card. SmartMX cards are able to emulate MIFARE Classic devices and thereby makes this interface compatible with any installed MIFARE Classic infrastructure. The contactless interface can be used to communicate via any protocol, particularly the MIFARE protocol and self defined contactless transmission protocols. SmartMX enables the easy implementation of state-of-the-art operating systems and open platform solutions including JCOP (the Java Card Operating System) and offers an optimized feature set together with the highest levels of security. SmartMX incorporates a range of security features to counter measure side channel attacks like DPA, SPA etc. A true anticollision method (acc. ISO/IEC 14443-3), enables multiple cards to be handled simultaneously.

It should be noted that the emulation of MIFARE Classic cards is not only restricted to SmartMX cards, but there may also exist other present or future smartcards being able to emulate MIFARE Classic cards.

It should further be noted that the invention is not exclusively restricted to MIFARE technology, but also applies to other memory devices that comprise a plurality of memory sectors wherein the sectors are protected against unauthorized access by sector keys.

In February 2007 the GSM Assocation (GSMA) published a white paper outlining operator community guidance for the eco-system parties involved in the development of Mobile NFC (Near Field Communication) services. Mobile NFC is defined as the combination of contactless services with mobile telephony, based on NFC technology. The mobile phone with a hardware-based secure identity token (the UICC) can provide the ideal environment for NFC applications. The UICC can replace the physical card thus optimising costs for the Service Provider, and offering users a more convenient service. Various different entities are involved in the Mobile NFC ecosystem. These are defined below:

Customer—uses the mobile device for mobile communications and Mobile NFC services. The customer subscribes to an MNO and uses Mobile NFC services.

Mobile Network Operator (MNO)—provides the full range mobile services to the Customer, particularly provides UICC and NFC terminals plus Over The Air (OTA) transport services.

Service Provider (SP)—provides contactless services to the Customer (SPs are e.g. banks, public transport companies, loyalty programs owners etc.).

Retailer/Merchant—service dependent, e.g. operates a NFC capable Point of Sales (POS) terminal.

Trusted Service Manager (TSM)—securely distributes and manages the Service Providers' services to the MNO customer base.

Handset, NFC Chipset and UICC Manufacturer—produce Mobile NFC/Communication devices and the associated UICC hardware.

Reader Manufacturer—produces NFC reader devices.

Application developer—designs and develops the Mobile NFC applications.

Standardisation Bodies and Industry Fora—develop a global standard for NFC, enabling interoperability, backward compatibility and future development of NFC applications and services.

One of the key findings in said white paper is that Mobile NFC will be successful provided that the Mobile NFC eco-system is steady, providing value for all entities within it; and is efficient, by introducing a new role of the Trusted Service Manager.

The role of the Trusted Service Manager (TSM) is to:

Provide the single point of contact for the Service Providers to access their customer base through the MNOs.

Manage the secure download and life-cycle management of the Mobile NFC application on behalf of the Service Providers.

The TSM does not participate in the transaction stage of the service, thus ensuring that the Service Providers' existing business models are not disrupted. Depending on the national market needs and situations, the TSM can be managed by one MNO, a consortium of MNOs, or by independent Trusted Third Parties. The number of operating TSMs in one market will depend on the national market needs and circumstances.

The present inventions applies to a Mobile NFC ecosystem with Trusted Service Manager (TSM) as disclosed in the above referenced GSMA white book. Particularly, it takes into account the specific role of the TSM which acts as the single point of contact for the Service Providers to access their customer base through the MNOs and manages the secure download and life-cycle management of the Mobile NFC application on behalf of the Service Provider. However, while the GSMA whitebook defines the role of the TSM in theory, for successful applications in practice there are still a couple of obstacles and problems to overcome. One of these obstacles are the prevailing technical work flows of Service Providers in conjunction with their present business models. If Service Providers intend to provide applications, particularly MIFARE applications (ticket issue, access control, coupon issue etc.) they would like to transmit the application by SMS via the over-the-air (OTA) services of a Mobile Network Operator (MNO) to an NFC capable mobile phone being equipped with a memory device that comprises a plurality of key-protected memory sectors, particularly a MIFARE memory. In the NFC mobile phone the application has to be extracted from the SMS and has to be written either into (arbitrary) free memory sectors or into predefined sectors of the memory device that is specifically allocated to that particular application. In the first case the drawback is that a reader application must parse/read all the content of the memory device to find needed information. In the latter case the specific memory sectors have to be allotted to the SP in advance by an entity like a manufacturer of memory devices, particularly MIFARE cards, and the SP has to put additional instructions about the destination sector of the application into its SMS which is a potential security risk. This issue has become even worse by the definition of the TSM which now is the only instance that controls the memory device. The TSM has to transmit not only the application as requested by a SP but has to add critical information like the destination sector addresses and the sector keys of the memory device. Therefore, from a point of security using SMS as transport protocol for the TSM is risky. Further, many SPs are not willing to refrain from sending SMS to the NFC phones by themselves, since they earn money with this service.

OBJECT AND SUMMARY OF THE INVENTION

It is an object of the invention to provide a method of the type defined in the opening paragraph, a system of the type defined in the second paragraph, and a Trusted Service Manager of the type defined in the third paragraph in which the disadvantages defined above are avoided.

In order to achieve the object defined above, with a method according to the invention characteristic features are provided so that a method according to the invention can be characterized in the way defined below, that is:

A method for transmitting a service or application from a Service Provider via a Trusted Service Manager to a mobile phone being equipped with a memory device comprising a plurality of memory sectors wherein the sectors are protected against unauthorized access by sector keys, wherein the method comprises:

at the Service Provider, sending a request that contains the application together with a unique identifier of the mobile phone, particularly its telephone number, to the Trusted Service Manager via a first communication channel;

at the Trusted Service Manager, extracting the application and the unique identifier of the mobile phone from the received request; assigning at least one destination sector and an associated sector key of the memory device to the application; compiling the application, the sector key(s) and the sector number(s) of the destination sector(s) into a setup-message; encrypting the setup-message; and transmitting the setup-message via a second communication channel, preferably an over-the-air service of a Mobile Network Operator, to the mobile phone.

In order to achieve the object defined above, with a method according to the invention characteristic features are provided so that a method according to the invention can be characterized in the way defined below, that is:

A method for transmitting a service or application from a Service Provider via a Trusted Service Manager to a mobile phone being equipped with a memory device comprising a plurality of memory sectors wherein the sectors are protected against unauthorized access by sector keys, wherein the method comprises:

at the Service Provider, sending a request that contains the application together with a unique identifier of the mobile phone, particularly its telephone number, to the Trusted Service Manager via a first communication channel;

at the Trusted Service Manager, extracting the application and the unique identifier of the mobile phone from the received request; assigning at least one destination sector and associated sector key of the memory device to the application; compiling the application, the sector key(s) and the sector number(s) of the destination sector(s) into a setup-message; encrypting the setup-message; and transmitting the setup-message via the first communication channel to the Service Provider;

at the Service Provider, transmitting the setup-message via a second communication channel, preferably an over-the-air service of a Mobile Network Operator, to the mobile phone.

The memory device is preferably configured as a MIFARE device.

In order to achieve the object defined above, with a Trusted Service Manager according to the invention characteristic features are provided so that a Trusted Service Manager according to the invention can be characterized in the way defined below, that is:

A Trusted Service Manager being adapted to receive from a Service Provider—via a first communication channel such as a computer network—a request that contains an application together with a unique identifier of a mobile phone, particularly its telephone number, wherein the mobile phone is equipped with a memory device comprising a plurality of memory sectors wherein the sectors are protected against unauthorized access by sector keys; extracting the application and the unique identifier of the mobile phone from the received request; assigning at least one destination sector and associated sector key of the memory device to the application; compiling the application, the sector key(s) and the sector number(s) of the destination sector(s) into a setup-message; encrypting the setup-message; and transmitting the setup-message to either the mobile phone via a second communication channel, preferably an over-the-air service such as SMS of a Mobile Network Operator, or the Service Provider via the first communication channel.

In order to achieve the object defined above, with a computer program product according to the invention characteristic features are provided so that a computer program product according to the invention can be characterized in the way defined below, that is:

A computer program product being directly loadable into the memory of a mobile phone being equipped with a memory device being equipped with a memory device comprising a plurality of memory sectors wherein the sectors are protected against unauthorized access by sector keys, wherein the computer program product comprises software code portions for performing—when running on the mobile phone—the steps of decrypting a setup-message; extracting from the setup-message an application, at least one destination sector of the memory device and associated sector key(s); and storing the application in the destination sector(s) of the memory device (MIF) by using the extracted sector key(s).

In order to achieve the object defined above, a mobile phone according to the invention comprises an arithmetic-logic unit and a memory and processes the computer program product according to the above paragraph.

The characteristic features according to the invention provide the advantage that the setup of the memory device, particularly a MIFARE setup, is carried out in a secure manner, preventing a hacker to get information about the memory device in the user's mobile phone, particularly the sector keys. Another advantage is that the Service Provider does not get information about sensitive information related to the memory device in the user's mobile phone either.

The measures as claimed in claim 3, claim 4, or claim 5, respectively, provide the advantage that they rely on well-defined highly accessible network infrastructure and services.

The measures as claimed in claim 6 provides the advantage that even existing mobile phones can be upgraded with software that reliably cooperates with the Trusted Service Manager and manages all tasks to install applications like MIFARE applications.

The aspects defined above and further aspects of the invention are apparent from the exemplary embodiments to be described hereinafter and are explained with reference to these exemplary embodiments.

BRIEF DESCRIPTION OF THE DRAWINGS

The invention will be described in more detail hereinafter with reference to exemplary embodiments. However, the invention is not limited to them.

DESCRIPTION OF EMBODIMENTS

Figures 1, 2, 3:
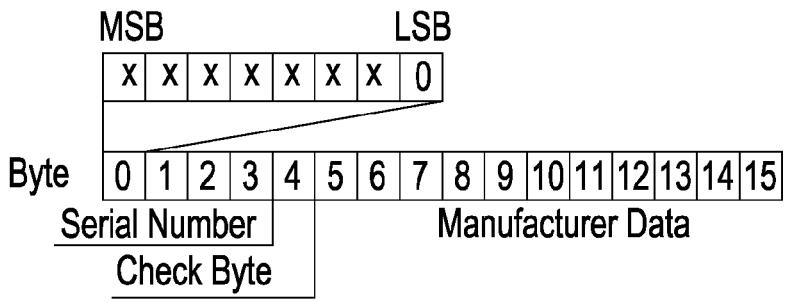
FIG. 1 shows the memory organization of a MIFARE Standard 1 k EEPROM.
FIG. 2 shows the manufacturer block of a MIFARE memory.
FIG. 3 shows the sector trailer of a sector of MIFARE memory.
Figure 4:
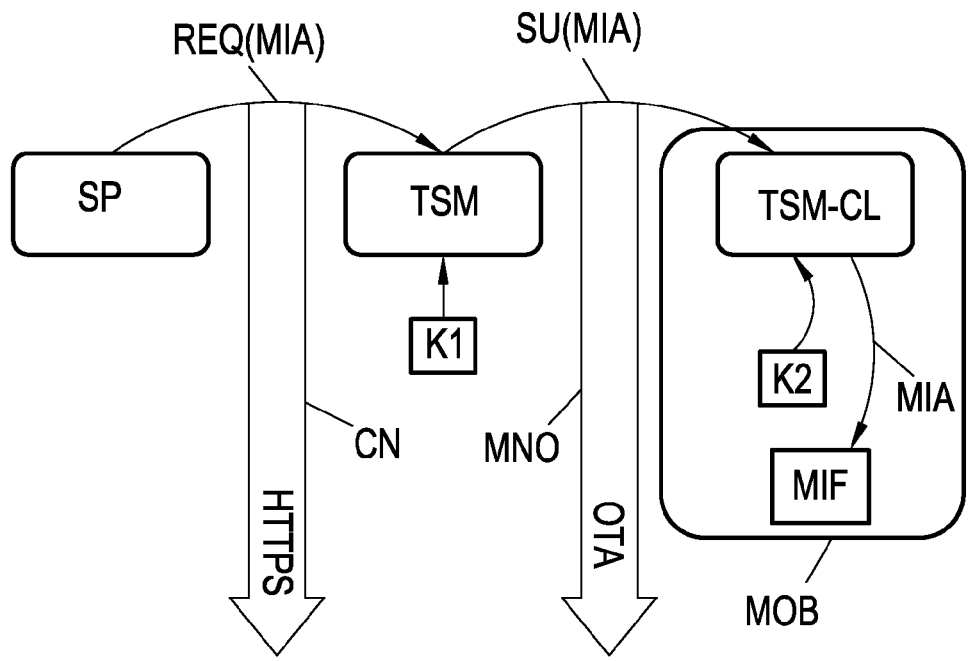
FIG. 4 shows a flowchart of a first embodiment of the invention.
Figure 5:
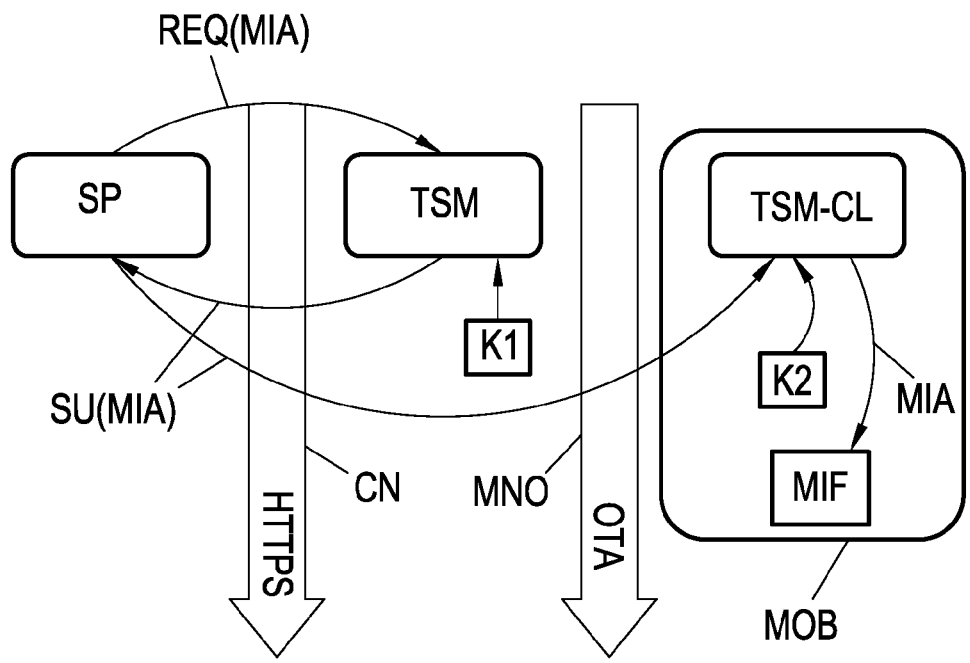
FIG. 5 shows a flow chart of a second embodiment of the invention.

FIG. 4 shows a flowchart of a first embodiment of the invention. In this embodiment only the Trusted Service Manager TSM corresponds with NFC mobile phones being equipped with a MIFARE memory device as a preferred example of memory devices comprising multiple key-protected memory sectors. It should be noted that the term "MIFARE memory devices" does not only comprise classical MIFARE memory cards, but also other smartcards that emulate the MIFARE protocol such as SmartMX cards. The description of the present embodiments of the invention is based on the scenario that a Service Provider SP, like a bank, a public transport company, a ticket provider, etc., wants to install a new MIFARE service or application MIA (ticket, access control, coupon, etc.) in a memory device MIF of a mobile phone MOB comprising the memory device MIF and having NFC capabilities. The memory device MIF is e.g. a MIFARE Standard 1 k memory card as shown in FIG. 1 or an emulation card. In order to forward the MIFARE application MIA the SP sends a request REQ(MIA) that contains the MIFARE application MIA together with a unique identifier of the mobile phone, particularly its telephone number, to the Trusted Service Manager TSM via a first communication channel CN which e.g. is configured as a computer network such as the Internet. In the present example the preferred data transmission protocol between the SP and the TSM is HTTPS. The Service Provider has got the unique identifier of the mobile phone directly from a user of the phone, e.g. when the user orders a ticket via the website of the Service Provider and inputs the telephone number into a form.

When the TSM receives the request REQ(MIA) from the SP it extracts the MIFARE application MIA and telephone number of the mobile phone and assigns under its own discretion one or more destination sectors and the associated sector key(s) (key A or B, see FIG. 1) of the memory device MIF. Next, the TSM compiles the MIFARE application MIA, the sector key(s) and the sector number(s) of the destination sectors into a setup-message SU(MIA) which in a following step is encrypted by the TSM according to an appropriate encrypting procedure. For instance, asymmetric encrypting procedures like RSA using a public key K1 can be employed. Once, the encrypted setup-message SU(MIA) has been generated the TSM sends it over a second communication channel, particularly an over-the-air service OTA of a Mobile Network Operator MNO to the mobile phone MOB. Presently, the preferred OTA service is SMS. In the mobile phone MOB there is a TSM client software application TSM-CL running being designed to extract all the data from the received encrypted setup-message SU(MIA) by decrypting it, e.g. by using a private key K2 and writing the extracted MIFARE application MIA into the assigned destination sector(s) of the memory device MIF by using the extracted sector key(s). The TSM client software application TSM-CL will be installed as an independent application in the mobile phone MOB and may contain the decryption key K2. Alternatively, the decryption key K2 will be separately installed in the mobile phone MOB via SMS or the like.

It should be noted that according to the present invention the TSM has full control over the content and memory allocation of the memory device MIF at any time by keeping a data base with the installed applications and their destination sectors in the memory device memory as well as the appropriate sector keys. Due to encryption using SMS is not longer a security risk.

In the first embodiment of the invention the Service Provider SP does not have any communication with the mobile phones. However, there are applications and circumstances under which the SP prefers to send messages to the mobile phones by itself, rather than having to rely on a TSM. In a second embodiment the present invention provides a solution for this requirement without departing from the rule that only the TSM should have knowledge about the internal memory allocation and the keys of memory devices MIF in mobile phones MOB in order to keep security high.

This second embodiment of the invention is depicted in the flowchart of FIG. 2. Here again the scenario is that a Service Provider SP intends to install a new MIFARE application MIA (ticket, access control, coupon, etc.) in a memory device MIF that is incorporated in a NFC capable mobile phone MOB. The SP sends a request REQ(MIA) that contains the MIFARE application MIA together with a unique identifier of the mobile phone, particularly its telephone number, to the Trusted Service Manager TSM via a first communication channel CN which e.g. is configured as a computer network such as the Internet. The presently preferred data transmission protocol between the SP and the TSM is HTTPS.

When the TSM receives the request REQ(MIA) from the SP it extracts the MIFARE application MIA and telephone number of the mobile phone and assigns under its own discretion one or more destination sectors and the associated sector key(s) (key A or B, see FIG. 1) of the memory device MIF, compiles the MIFARE application MIA, the sector key(s) and the sector number(s) of the destination sectors into a setup-message SU(MIA) and encrypts the setup-message SU(MIA) according to an appropriate encrypting procedure, e.g. employing RSA encryption routines using a public key K1. After the encrypted setup-message SU(MIA) has been generated the TSM sends it back to the SP via the first communication channel CN. The SP takes this encrypted setup-message SU(MIA) and forwards it via a second communication channel, particularly an over-the-air service OTA of a Mobile Network Operator MNO to the mobile phone MOB. It is preferred that the SP packs the encrypted setup-message SU(MIA) into a SMS that is used as OTA service. In the mobile phone MOB a TSM client software application TSM-CL extracts all the data from the received encrypted setup-message SU(MIA) by decrypting it, e.g. by using a private key K2, and writes the extracted MIFARE application MIA into the assigned destination sector(s) of the memory device MIF by using the extracted sector key(s). The TSM client software application TSM-CL may be installed as an independent application in the mobile phone MOB and may contain the decryption key K2. Alternatively, the decryption key K2 will be separately installed in the mobile phone MOB via SMS or the like. Thereby the SP still has the possibility to send SMS to mobile phones MOB. However, the SP has no information about critical data such as the destination sectors and sector keys of the memory device MIF incorporated in the mobile phones MOB. Further, due to the encryption of said data by the TSM the per se insecure transport protocol SMS has been hardened so that it provides a very high security level.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for transmitting at least one of a service and an application from a Service Provider via a Trusted Service Manager to a mobile phone having a memory device comprising a plurality of memory sectors, wherein the sectors are protected against unauthorized access by sector keys, wherein the method comprises: at the Service Provider, sending a request that contains the service or application together with a unique identifier of the mobile phone, to the Trusted Service Manager via a first communication channel; at the Trusted Service Manager, extracting the service or application and the unique identifier of the mobile phone from the received request; assigning at least one destination sector and an associated sector key of the memory device to the service or application; compiling the service or application, the sector key(s) and a sector number of the destination sector(s) into a setup-message; encrypting the setup-message; and transmitting the setup-message via a second communication channel of a Mobile Network Operator, to the mobile phone.

2. A method for transmitting at least one of a service and an application from a Service Provider via a Trusted Service Manager to a mobile phone having a memory device comprising a plurality of memory sectors wherein the sectors are protected against unauthorized access by sector keys, wherein the method comprises: at the Service Provider, sending a request that contains the service or application together with a unique identifier of the mobile phone to the Trusted Service Manager via a first communication channel; at the Trusted Service Manager, extracting the service or application and the unique identifier of the mobile phone from the received request; assigning at least one destination sector and associated sector key of the memory device to the service or application; compiling the service or application, the sector key(s) and a sector number of the destination sector(s) into a setup-message; encrypting the setup-message; and transmitting the setup-message via the first communication channel to the Service Provider; at the Service Provider, transmitting the setup-message via a second communication channel of a Mobile Network Operator, to the mobile phone.

3. The method as claimed in claim 1, wherein the first communication channel is a computer network.

4. The method as claimed in claim 3, wherein the data transmission protocol used in the first communication channel is Hypertext Transfer Protocol Secure (HTTPS).

5. The method as claimed in claim 1, wherein the service to transmit the setup-message over the second communication channel is Short Message Service.

6. The method as claimed in claim 1, wherein in the mobile phone the service or application, the destination sector(s) of the memory device and the sector key(s) are decrypted and extracted from the received setup-message and the service or application is stored in the destination sector(s) of the memory device by using the extracted sector key(s).

7. The method as claimed in claim 1, wherein the memory device is a MIFARE device.

8. A system for transmitting at least one of a service and an application from a Service Provider via a Trusted Service Manager to a mobile phone being equipped with a memory device comprising a plurality of memory sectors, wherein the sectors are protected against unauthorized access by sector keys, wherein the Service Provider, the Trusted Service Manager and the mobile phone comprise computing units and software code portions for performing the steps of a method according to claim 1.

9. The system as claimed in claim 8, wherein the memory device is a MIFARE device.

10. A Trusted Service Manager being adapted to receive from a Service Provider--via a first communication channel request that contains an application together with a unique identifier of a mobile phone, wherein the mobile phone is equipped with a memory device comprising a plurality of memory sectors wherein the sectors are protected against unauthorized access by sector keys; extracting the application and the unique identifier of the mobile phone from the received request; assigning at least one destination sector and associated sector key of the memory device to the application; compiling the application, the sector key(s) and a sector number of the destination sector(s) into a setup-message; encrypting the setup-message; and transmitting the setup-message to at least one of the mobile phone via a second communication channel, and the Service Provider via the first communication channel.

11. A non-transitory machine-readable storage medium in a memory of a mobile phone being equipped with a memory device comprising a plurality of memory sectors wherein the sectors are protected against unauthorized access by sector keys, wherein the non-transitory machine-readable storage medium comprises instructions for performing-when running on the mobile phone the steps of:

receiving a setup-message from a Service Provider, the setup-message encrypted by a Trusted Service Manager: decrypting the setup-message;

extracting from the setup-message an application, at least one sector number of the destination sector of the memory device and associated sector key(s); and storing the application in the destination sector(s) of the memory device by using the extracted sector key(s).

12. The non-transitory machine-readable storage medium as claimed in claim 11, wherein the instructions are downloadable from a remote server via a communication network.

13. A mobile phone with at least one of an arithmetic-logic unit and a central processing unit and a memory, wherein the mobile phone is adapted to process the instructions of the non-transitory machine-readable storage medium of claim 11.

14. The mobile phone as claimed in claim 13, wherein the memory device is a MIFARE device.

15. The non-transitory machine-readable storage medium of claim 11, wherein the instructions for receiving a setup-message comprise instructions for receiving the setup message via Short Message Service.

* * * * *